United States Patent
Chen et al.

(10) Patent No.: US 7,889,744 B2
(45) Date of Patent: Feb. 15, 2011

(54) METHOD AND APPARATUS FOR AUTOMATIC SYNCHRONIZATION OF MONITORING POINTS OF A NETWORK MANAGEMENT SYSTEM ALONG A PERMANENT VIRTUAL CIRCUIT

(75) Inventors: Sean Chen, Sunnyvale, CA (US); Zesen Chen, Pleasanton, CA (US); Yongdong Zhao, Pleasanton, CA (US); Peter Chou, San Ramon, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 828 days.

(21) Appl. No.: 11/149,631

(22) Filed: Jun. 10, 2005

(65) Prior Publication Data

US 2006/0280183 A1    Dec. 14, 2006

(51) Int. Cl.
*H04L 12/56* (2006.01)
*H04L 12/54* (2006.01)

(52) U.S. Cl. .................... 370/395.1; 370/218; 370/232; 370/235; 370/252; 370/395.2; 370/399; 370/410

(58) Field of Classification Search .............. 370/217, 370/218, 232, 235, 248, 252, 351, 389, 395.1, 370/395.2, 399, 410
See application file for complete search history.

(56) References Cited

U.S. PATENT DOCUMENTS

| | | | |
|---|---|---|---|
| 6,055,239 A * | 4/2000 | Kato | 370/409 |
| 6,643,254 B1 | 11/2003 | Kajitani et al. | |
| 6,810,041 B2 | 10/2004 | Walker, III et al. | |
| 2002/0042840 A1 * | 4/2002 | Yamada | 709/239 |
| 2002/0150108 A1 | 10/2002 | Nattkemper et al. | |
| 2003/0189926 A1 * | 10/2003 | Watanabe et al. | 370/389 |
| 2004/0114580 A1 * | 6/2004 | Santry et al. | 370/355 |
| 2004/0202112 A1 | 10/2004 | McAllister et al. | |

* cited by examiner

*Primary Examiner*—Pankaj Kumar
*Assistant Examiner*—Lonnie Sweet
(74) *Attorney, Agent, or Firm*—Hanley, Flight & Zimmerman, LLC

(57) ABSTRACT

A method and apparatus for automatic synchronization of monitoring points for a network management system ("NMS") along a permanent virtual circuit ("PVC") is disclosed. A NMS in an asynchronous transfer mode ("ATM") network coupled to a plurality of ATM switches is operative to monitor each of the plurality of ATM switches storied in a monitoring service object corresponding to a PVC. The NMS receives at least one notification from at least one ATM switch of the plurality of ATM switches indicating an ATM switch has been added or removed from the PVC. In response to the at least notification, the NMS adds at least one ATM switch to the monitoring service object or removes at least one ATM switch from the monitoring service object.

15 Claims, 3 Drawing Sheets

METHOD AND APPARATUS FOR AUTOMATIC SYNCHRONIZATION OF MONITORING POINTS OF A NETWORK MANAGEMENT SYSTEM ALONG A PERMANENT VIRTUAL CIRCUIT

BACKGROUND

An asynchronous transfer mode ("ATM") network is an intelligent network that provides the ability to break down large amounts of information into discrete uniform data packets known as cells and efficiently transfer the cells throughout the ATM network. ATM networks typically comprise a plurality of ATM switches coupled together to accept and transfer the cells throughout the ATM network. One way to establish connections, or a path, between the plurality of ATM switches is through the use of a permanent virtual circuit ("PVC").

A PVC is a software-defined logical connection, typically established by a network management system ("NMS") of the ATM network. A PVC is typically defined as a function of user-defined starting and ending points within the ATM network, and a minimum bandwidth requirement for the PVC. Using the user-defined parameters, the NMS establishes and monitors the PVC within the ATM network.

If the NMS determines at least one of the NMS switches along the PVC is congested and may not receive a cell for transport through the PVC, the NMS may reroute the PVC. Additionally, it is possible for a customer to reroute the PVC for various reasons by reprovisioning the PVC through NMS. When the PVC is rerouted, the NMS must establish new monitoring points to monitor the ATM switches along the path of the rerouted PVC.

Traditionally, monitoring points have been manually specified within a NMS for each ATM switch along a PVC. Thus, when a PVC is rerouted, to continue monitoring the PVC, monitoring points would need to be manually specified in the NMS for each ATM switch along the rerouted PVC.

DETAILED DESCRIPTION OF THE DRAWINGS AND THE PRESENTLY PREFERRED EMBODIMENTS

The preferred embodiments are directed to a system and method for automatic synchronization of monitoring points of a network management system ("NMS") along a permanent virtual circuit ("PVC"). This system and method increases efficiency and provides the ability to easily manage large asynchronous transfer mode ("ATM") networks by providing a method to automatically specify new monitoring points within the NMS for each ATM switch which has been added to a rerouted PVC and remove any monitoring points in the NMS for ATM switches that have been removed from the PVC.

Figure 1:
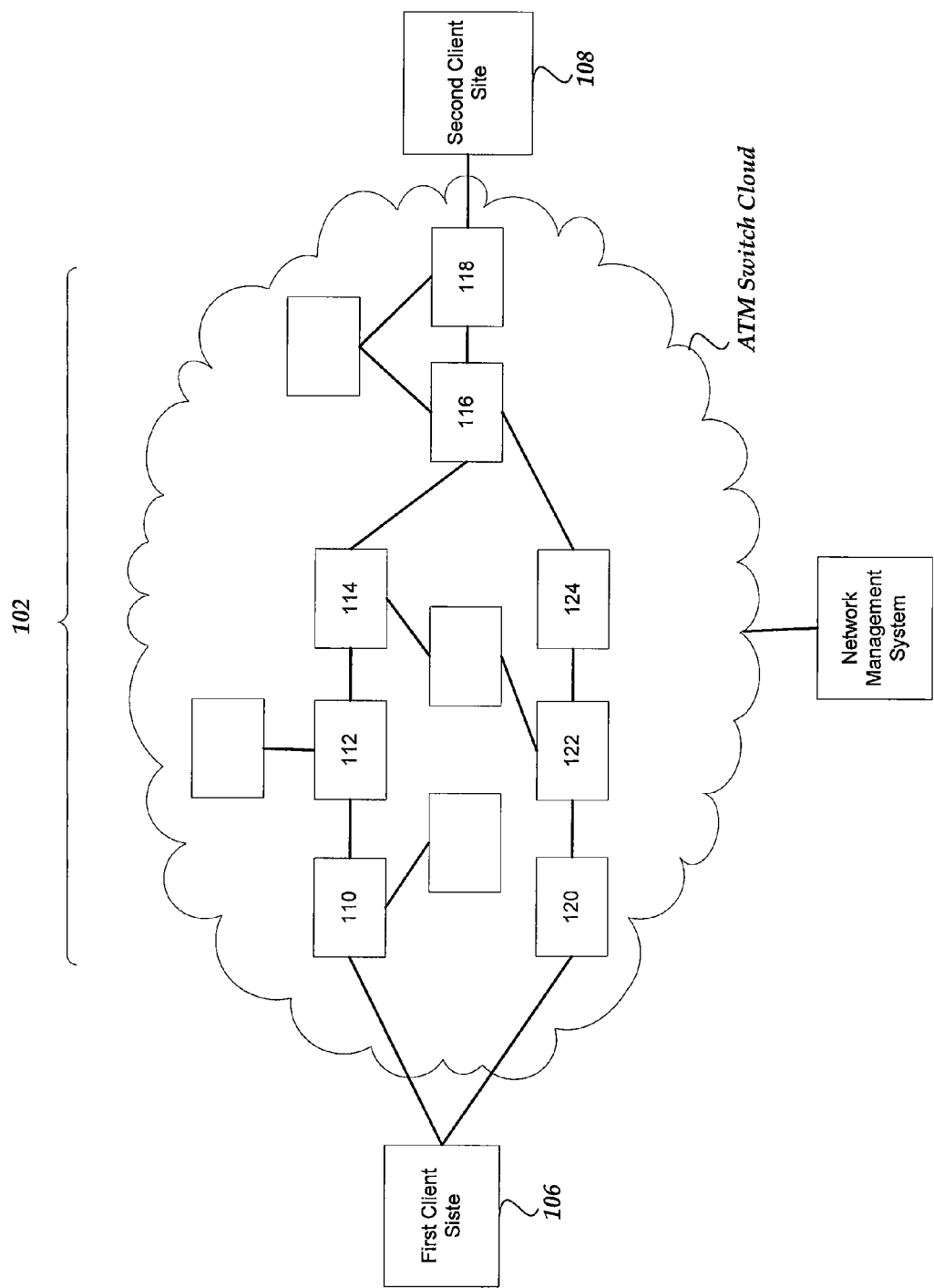
FIG. 1 is a diagram of one embodiment of an asynchronous transfer mode ("ATM") network.

FIG. 1 is a diagram of one embodiment of an ATM network 100. The ATM network 100 comprises a plurality of ATM switches 102 coupled together, a NMS 104 coupled with each of the plurality of ATM switches 102, a first customer site 106, and a second customer site 108. Generally, the NMS 104 establishes a PVC between the plurality of ATM switches 102 so that a data packet, known as a cell, may be sent from the first customer site 106 to the second customer site 108.

It will be appreciated that while the illustrative ATM network 100 only contains first and second customer sites 106, 108, and a single PVC, other ATM networks may contain any number of customer sites and PVCs. The ATM switch 102 may be a Lucent CBX-500 or any other type of ATM switch known in the art; the NMS 104 may be a Lucent NavisXtend or any other type of NMS known in the art; and the first and second customer sites 106,108 may be a Cisco 7500 router or any other type of device known in the art to connect networks.

In one embodiment, a first PVC path is established from the first customer site 106 to the second customer site 108 through a first, second, third, fourth, and fifth ATM switch 110, 112, 114, 116, 118. During operation, the NMS 104 monitors the plurality of ATM switches 102 in general and ATM switches 110, 112, 114, 116, 118 for the PVC.

Periodically, a customer may reroute the PVC or the NMS 104 may reroute the PVC in response to determining that an ATM switch along the PVC is congested and cannot accept a new cell for transfer through the ATM network 100. For example, when a cell is to be sent from the first customer site 106 to the second customer site 108, the customer may reroute the PVC from the first customer site 106 to the second customer site 108 through a sixth, seventh, eighth, fourth and fifth ATM switches 120, 122, 124, 116, 118. In response to changing the connections of the PVC between the first and second customer sites 106, 108, the NMS 104 establishes new monitoring points along the rerouted PVC in the monitoring service object associated with the PVC and releases unused monitoring points along the first PVC path in the monitoring service object associated with the PVC.

For example, when switching from the first PVC path to the second PVC path, the NMS 104 establishes new monitoring points in the monitoring service object associated with the PVC for the sixth, seventh, and eighth ATM switches 120, 122, 124; maintains the monitoring points for the fourth and fifth ATM switches 116, 118; and releases the monitoring points for the first, second, and third ATM switches 110, 112, 114.

Figure 2:
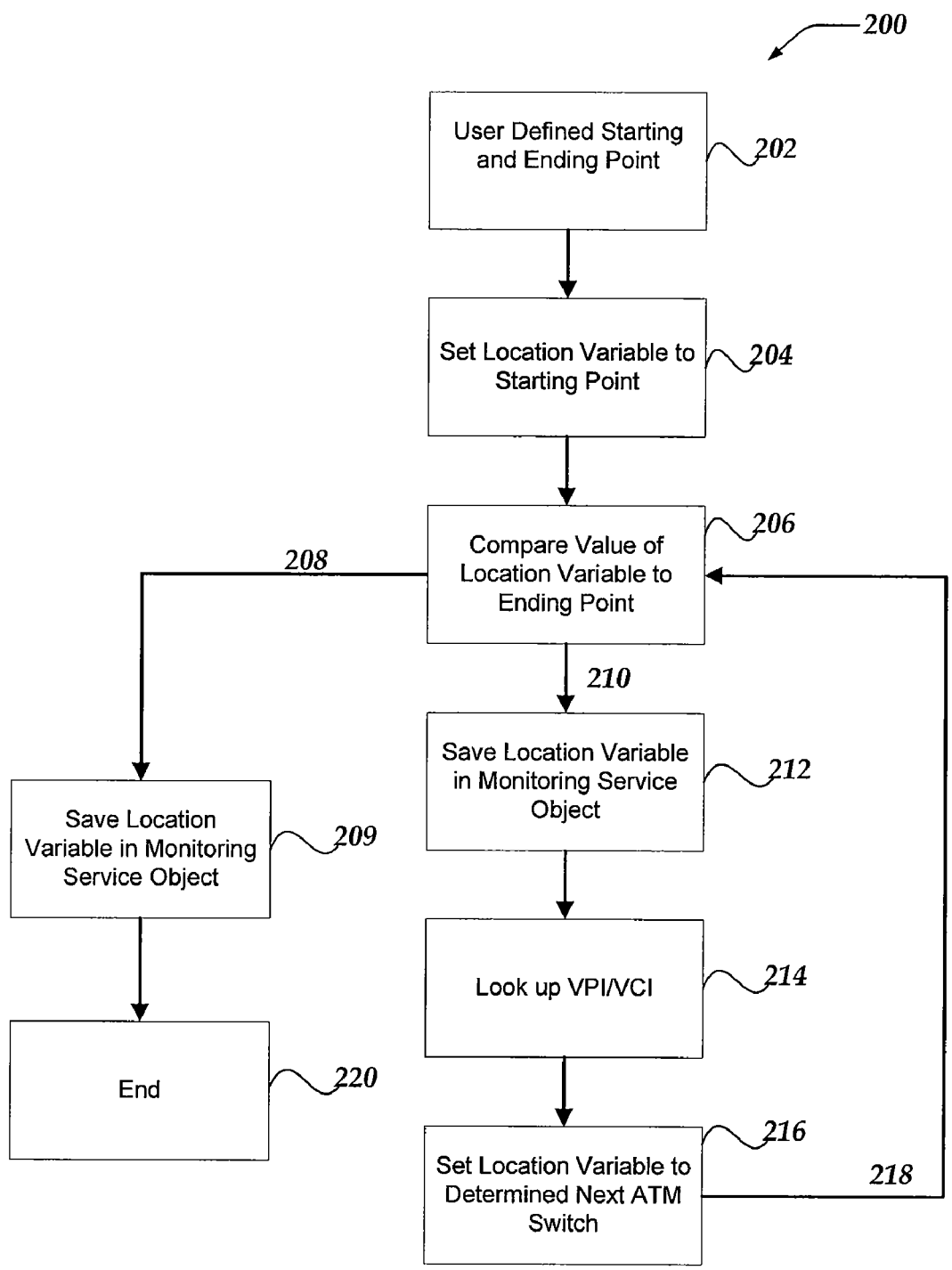
FIG. 2 is a flow chart of a method of an embodiment for creating a monitoring service object associated with a permanent virtual circuit ("PVC")
Figure 3:
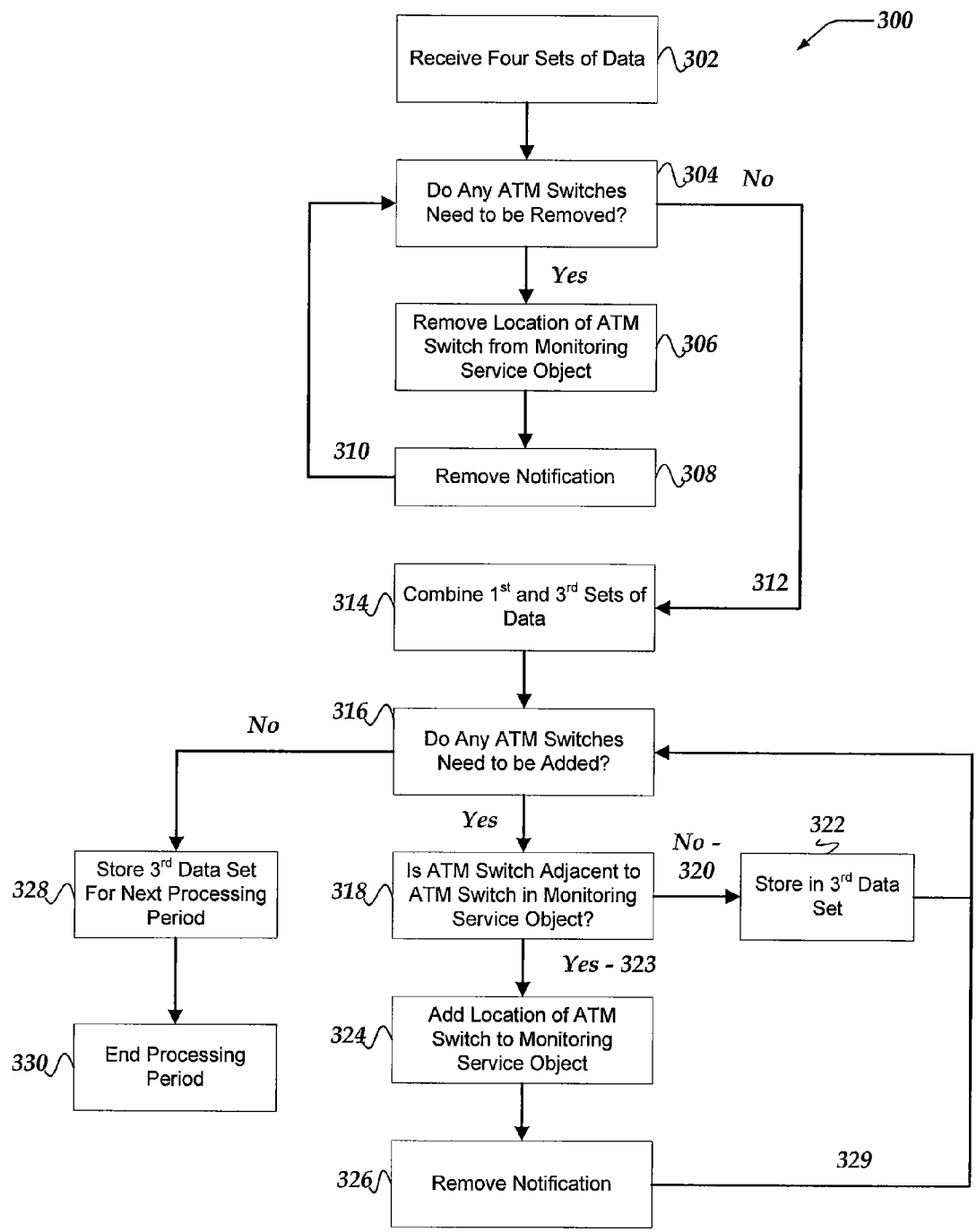
FIG. 3 is a flow chart of a method of an embodiment for synchronizing a monitoring service object with a PVC after the PVC is rerouted.

FIGS. 2 and 3 are flow diagrams of a method of an embodiment for automatic synchronization of a monitoring service object of a NMS and a rerouted PVC. A monitoring service object is a listing of ATM switches within a PVC that the NMS monitors during operation. FIG. 2 shows one embodiment of a method for creating a monitoring service object and FIG. 3 shows one embodiment of a method for synchronizing the monitoring service object created in FIG. 2 with the PVC after the PVC is rerouted.

Generally, the method of FIG. 2 determines a location of the ATM switches along a PVC and creates a monitoring service object associated with the PVC that comprises the location of each ATM switch along the PVC. The method begins at step 202 with locations of a user-defined starting and ending point for the PVC. A value of a location variable is set to the location of the starting point of the PVC at 204 and the value of the location variable is compared to the location of the ending point of the PVC at 206. If the location variable is equal to the location of the ending point of the PVC 208, the value of the location variable is saved in the monitoring service object 209 and the method ends 220. However, if the value of the location variable is not equal to the location of the ending point of the PVC 210, the value of the location variable is saved in the monitoring service object 212 and the NMS looks up the virtual path identifier/virtual channel identifier ("VPI/VCI") in a header of a cell at 214. The VPI/VCI is a number typically stored in a header of a cell which identifies a specific PVC through the plurality of ATM switches which the cell is to follow when traveling from one client site to another.

Alternatively, the NMS may determine the next ATM switch along the PVC by looking at the outgoing path for the PVC as stored in the current ATM switch. Typically, each ATM switch will store a table comprising a location of an incoming and outgoing ATM switch along the PVC, along with the current status of the PVC.

The NMS looks up the location of the next ATM switch along the PVC according to the VPI/VCI at 214 and assigns the value of the location variable to the location of the next ATM switch at 216. The NMS then loops at 218 and repeats step 206 comparing the value of the location variable to the location of the ending point of the PVC. This process is repeated until the value of the location variable is equal to the location of the ending point of the PVC 208 and the location of all ATM switches comprising the PVC are stored in the monitoring service object 209.

For example, with respect to the second PVC path described above in relation to FIG. 1, the method of FIG. 2 begins at step 202 with the location of the first and second customer sites 106, 108 (FIG. 1). A value of a location variable is assigned to be the location of the first customer site 106 (FIG. 1) at 204 and the value of the location variable is compared to the location of the second customer site 108 (FIG. 1) at 206. The NMS determines that the value of the location variable is not equal to the location of the second customer site 108 (FIG. 1) at 210. In response, the NMS saves the value of the location variable in a monitoring service object 212 and looks up the value of the VPI/VCI in the header of a cell or in the current ATM switch at 214.

Using the VPI/VCI of the PVC, the NMS determines that the sixth ATM switch 120 (FIG. 1) occurs after the first customer site 106 (FIG. 1) along the PVC. The NMS assigns the value of the location variable to the location of the sixth ATM switch 120 (FIG. 1) at 216 and loops 218 to compare the value of the location variable to the location of the second customer site 108 (FIG. 1) at 206. It will be appreciated that the NMS repeats the above-described process until the value of the location variable is equal to the location of the second customer site 108 (FIG. 1). Further, it will be appreciated that when the method ends 220, the monitoring service object will comprise locations for the first and second customer sites 106, 108, and the sixth, seventh, eighth, fourth, and fifth ATM switches 120, 122, 124, 116, 118.

Generally, the method of FIG. 3 synchronizes the monitoring service object created using the method of FIG. 2 after a PVC is rerouted by removing any monitoring points corresponding to ATM switches that have been removed from the PVC and adding monitoring points corresponding to ATM switches which have been added to the PVC. It will be appreciated that while the method of FIG. 3 shows a single processing period of the NMS, it may be necessary for the NMS to execute for more than one processing period to complete the process of removing all the monitoring points corresponding to ATM switches that have been removed from a rerouted PVC and add monitoring points corresponding to ATM switches which have been added to the rerouted PVC. Additionally, while the method of FIG. 3 illustrates synchronizing a single monitoring service object, the method of FIG. 3 may be implemented to simultaneously synchronize multiple monitoring service objects corresponding to multiple PVCs.

The method 300 begins at step 302 with the NMS receiving four sets of data. A first set of data comprises a plurality of notifications indicating the ATM switches that have been added to the rerouted PVC. Typically, when a PVC is rerouted, ATM switches that have been added or removed will detect that the PVC has been rerouted and send a notification to the NMS. A second set of data comprises a plurality of notifications indicating the ATM switches that have been removed from the rerouted PVC. A third set of data comprises a plurality of notifications indicating the ATM switches that have been added to the rerouted PVC that the NMS received in a previous processing period, but the NMS was unable to process. Finally, a fourth set of data comprises a plurality of monitoring service objects such as those created in the method of FIG. 2, each monitoring service object comprising a plurality of ATM switches comprising a PVC.

Periodically, the NMS cannot process a notification that an ATM switch has been added to a rerouted PVC due to the fact the ATM switch corresponding to the notification is not adjacent to an ATM switch that is currently part of the monitoring service object. This occurs when a PVC is rerouted and the NMS does not receive notifications from all of the affected ATM switches in a single processing period. Therefore, the notification is stored for a subsequent processing period after the ATM switch adjacent to the ATM switch corresponding to the notification has been added to the monitoring service object.

After receiving the four sets of data 302, the NMS determines whether there are any notifications for ATM switches that have been removed from the PVC in the second set of data at 304. If there are no notifications, the method moves to step 314. Otherwise, the NMS processes a notification by removing the monitoring point corresponding to the ATM switch in the monitoring service object 304 and removing the notification from the second set of data 306. The NMS continues 310 this processes by repeating steps 304, 306, and 308 until the NMS determines all the notification in the second set of data have been processed 312.

The NMS then combines the first and third sets of data into a single set of data 314. Combining the first and third set of data results in a single set of data comprising all of the unprocessed notifications that the NMS has received up to the current processing period for ATM switches that have been added to the rerouted PVC.

After combining the first and third sets of data 314, the NMS determines whether there are any notifications for ATM switches that have been added to the PVC in the combined set of data at 316. If there are no notifications, the method moves to step 328. Otherwise, the NMS determines whether an ATM switch corresponding to a notification of the combined data set is located adjacent to an ATM switch which is currently part of the monitoring service object 318. If the current notification is for an ATM switch that is not adjacent to an ATM switch which is currently part of the monitoring service object 320, the NMS stores the location of the ATM switch in a new third set of data and removes the notification from the combined data set at 322. The NMS then loops to determine whether there are any remaining notifications for ATM switches that have been added to the PVC in the combined set of data at 316.

However, if the ATM switch corresponding to the current notification is located adjacent to an ATM switch which is currently part of the monitoring service object 323, the NMS adds the location of the ATM switch to the monitoring service object 324 and removes the notification from the combined set of data 326. The NMS loops at 329 to repeat the described process for all remaining notifications in the combined set of data until all of the locations of the ATM switches of the combined set of data have been added to the monitoring service object 324 or stored in the third set of data 322. The NMS then saves the new third set of data for the next processing period 328 and the processing period ends 330.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. Accordingly, the invention is considered to include a tangible storage medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

Additionally, it will be understood that a device of the present invention includes broadly any electronic device that provides voice, video or data communication, such as a telephone, a cordless telephone, a mobile phone, a cellular telephone, a Personal Digital Assistant (PDA), a set-top box, a computer, and/or a server.

It is therefore intended that the foregoing detailed description be regarded as illustrative rather than limiting, and that it be understood that it is the following claims, including all equivalents, that are intended to define the spirit and scope of this invention.

The invention claimed is:

1. A method for synchronizing monitoring points in an asynchronous transfer mode ("ATM") network for a rerouted permanent virtual circuit ("PVC"), comprising:
    receiving a customer-defined starting and ending point for a PVC;
    assigning a first value of a location variable to a location of the starting point of the PVC;
    determining whether the first value of the location variable is equal to a location of the ending point;
    storing the first value of the location variable in a monitoring service object;
    determining a virtual path identifier/virtual channel identifier ("VPI/VCI") corresponding to the PVC to identify a location of an ATM switch that is located along the PVC path after the starting point of the PVC;
    assigning a second value of the location variable to the determined location of the ATM switch;
    storing the second value of the location variable in the monitoring service object;
    determining whether the second value of the location variable is equal to the location of the ending point;
    storing a first set of data comprising a plurality of notifications for ATM switches that have been added to the PVC;
    determining whether each ATM switch of the first set of data is adjacent to a location of an ATM switch stored in the monitoring service object, the monitoring service object comprising a plurality of ATM switches along the PVC;
    storing a location of each ATM switch of the first set of data that is determined to be adjacent to a location of an ATM switch stored in the monitoring service object in the monitoring service object;
    storing a location of each ATM switch of the first set of data that is determined to not be adjacent to a location of an ATM switch stored in the monitoring service object in a second data set; and
    storing the second data set for subsequent processing.

2. The method of claim 1, further comprising:
    storing a third set of data comprising a plurality of notifications for ATM switches that have been removed from the PVC; and
    removing a location of each ATM switch of the third set of data from the monitoring service object.

3. The method of claim 1, wherein the first set of data comprises:
    a first plurality of notifications for ATM switches that have been added to the PVC that a network management system ("NMS") received during a current processing period; and
    a second plurality of notifications for ATM switches that have been added to the PVC that the NMS received during a previous processing period.

4. The method of claim 1, further comprising:
    receiving a fourth set of data comprising a plurality of monitoring service objects.

5. A tangible storage medium excluding propagating signals and storing a set of computer readable instructions for synchronizing a monitoring service object of a network management system ("NMS") in an asynchronous transfer mode ("ATM") network with a rerouted permanent virtual circuit ("PVC"), the set of instructions to direct a processor to at least:
    receive a customer-defined starting and ending point for a PVC;
    assign a first value of a location variable to a location of the starting pointing point of the PVC;
    determine whether the first value of the location variable is equal to a location of the ending point;
    store the first value of the location variable in a monitoring service object;
    determine a virtual path identifier/virtual channel identifier ("VPI/VCI") corresponding to the PVC to identify a location of an ATM switch that is located along the PVC path after the starting point of the PVC;
    assign a second value of the location variable to the determined location of the ATM switch;
    store the second value of the location variable in the monitoring service object;
    determine whether the second value of the location variable is equal to the location of the ending point;
    store a first set of data comprising a plurality of notifications for ATM switches that have been added to the PVC;

determine whether each ATM switch of the first set of data is adjacent to a location of an ATM switch stored in the monitoring service object, the monitoring service object comprising a plurality of ATM switches along the PVC;

store a location of each ATM switch of the first set of data that is determined to be adjacent to a location of an ATM switch stored in the monitoring service object in the monitoring service object;

store a location of each ATM switch of the first set of data that is determined to not be adjacent to a location of an ATM switch stored in the monitoring service object in a second data set; and store the second data set for subsequent processing.

6. The tangible storage medium of claim 5, wherein the set of instructions further direct a processor to:

store a third set of data comprising a plurality of notifications for ATM switches that have been removed from the PVC; and remove a location of each ATM switch of the third set of data from the monitoring service object.

7. A method for synchronizing monitoring points in an asynchronous transfer mode ("ATM") network for a rerouted permanent virtual circuit ("PVC"), comprising:

receiving a customer-defined starting and ending point for a PVC;

assigning a first value of a location variable to a location of the starting pointing point of the PVC;

determining whether the first value of the location variable is equal to a location of the ending point;

storing the first value of the location variable in a monitoring service object;

determining a virtual path identifier/virtual channel identifier ("VPI/VCI") corresponding to the PVC to identify a location of an ATM switch that is located along the PVC path after the starting point of the PVC;

assigning a second value of the location variable to the determined location of the ATM switch;

storing the second value of the location variable in the monitoring service object;

determining whether the second value of the location variable is equal to the location of the ending point;

storing a first set of data comprising a plurality of notifications for ATM switches that have been added to the PVC;

storing a second set of data comprising a plurality of notifications for ATM switches that have been removed from the PVC;

removing a location of each ATM switch of the second set of data from the monitoring service object, the monitoring service object comprising a plurality of ATM switches along the PVC;

determining whether each ATM switch of the first set of data is adjacent to a location of an ATM switch stored in the monitoring service object;

storing a location of each ATM switch of the first set of data that is determined to be adjacent to a location of an ATM switch stored in the monitoring service object in the monitoring service object;

storing a location of each ATM switch of the first set of data that is determined to not be adjacent to a location of an ATM switch stored in the monitoring service object in a third data set; and storing the third data set for subsequent processing.

8. The method of claim 7, wherein the first set of data comprises:

a first plurality of notifications for ATM switches that have been added to the PVC that a network management system ("NMS") received during a current processing period; and a second plurality of notifications for ATM switches that have been added to the PVC that the NMS received during previous processing periods.

9. The method of claim 8, further comprising:

storing a fourth set of data comprising a plurality of monitoring service objects.

10. A tangible storage medium excluding propagating signals and storing a set of computer readable instructions for synchronizing a monitoring service object of a network management system ("NMS") in an asynchronous transfer mode ("ATM") network with a rerouted permanent virtual circuit ("PVC"), the set of instructions to direct a processor to at least:

receive a customer-defined starting and ending point for a PVC;

assign a first value of a location variable to a location of the starting pointing point of the PVC;

determine whether the first value of the location variable is equal to a location of the ending point;

store the first value of the location variable in a monitoring service object;

determine a virtual path identifier/virtual channel identifier ("VPI/VCI") corresponding to the PVC to identify a location of an ATM switch that is located along the PVC path after the starting point of the PVC;

assign a second value of the location variable to the determined location of the ATM switch;

store the second value of the location variable in the monitoring service object;

determine whether the second value of the location variable is equal to the location of the ending point;

store a first set of data comprising a plurality of notifications for ATM switches that have been added to the PVC;

store a second set of data comprising a plurality of notifications for ATM switches that have been removed from the PVC;

remove a location of each ATM switch of the second set of data from the monitoring service object, the monitoring service object comprising a plurality of ATM switches along the PVC;

determine whether each ATM switch of the first set of data is adjacent to a location of an ATM switch stored in the monitoring service object;

store a location of each ATM switch of the first set of data that is determined to be adjacent to a location of an ATM switch stored in the monitoring service object in the monitoring service object;

store a location of each ATM switch of the first set of data that is determined to not be adjacent to a location of an ATM switch stored in the monitoring service object in a third data set; and store the third data set for subsequent processing.

11. The tangible storage medium of claim 10, wherein the first set of data comprises:

a first plurality of notifications for ATM switches that have been added to the PVC that an NMS received during a current processing period; and a second plurality of notifications for ATM switches that have been added to the PVC that the NMS received during previous processing periods.

12. The method of claim 1, wherein the first set of data, the second set of data, and the monitoring service object are distinct sets of data.

13. The tangible storage medium of claim 5, wherein the first set of data, the second set of data, and the monitoring service object are distinct sets of data.

14. The method of claim 7, wherein the first set of data, the second set of data, and the monitoring service object are distinct sets of data.

15. The tangible storage medium of claim 10, wherein the first set of data, second set of data, third set of data, and the monitoring service object are distinct sets of data.

* * * * *